US011892168B2

(12) United States Patent
Yoshino et al.

(10) Patent No.: US 11,892,168 B2
(45) Date of Patent: Feb. 6, 2024

(54) COMBUSTOR AND GAS TURBINE EQUIPPED WITH THE SAME

(71) Applicant: MITSUBISHI HEAVY INDUSTRIES, LTD., Tokyo (JP)

(72) Inventors: Kota Yoshino, Tokyo (JP); Norihiko Motoyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/131,482

(22) Filed: Apr. 6, 2023

(65) Prior Publication Data

US 2023/0332772 A1 Oct. 19, 2023

(30) Foreign Application Priority Data

Apr. 18, 2022 (JP) .................................. 2022-068230

(51) Int. Cl.
| | |
|---|---|
| *F23R 3/34* | (2006.01) |
| *F02C 7/22* | (2006.01) |
| *F23R 3/28* | (2006.01) |
| *F02C 3/06* | (2006.01) |
| *F23R 3/50* | (2006.01) |

(52) U.S. Cl.
CPC .................. *F23R 3/34* (2013.01); *F02C 3/06* (2013.01); *F02C 7/222* (2013.01); *F23R 3/28* (2013.01); *F23R 3/346* (2013.01); *F23R 3/50* (2013.01); *F05D 2240/35* (2013.01)

(58) Field of Classification Search
CPC .... F02C 7/222; F23R 3/28; F23R 3/34; F23R 3/346; F23R 3/44; F23R 3/46; F23R 3/50; F23R 3/60
See application file for complete search history.

(56) References Cited

U.S. PATENT DOCUMENTS

| | | |
|---|---|---|
| 2009/0084082 A1 | 4/2009 | Martin et al. |
| 2016/0201562 A1* | 7/2016 | Chasse, Jr. ................ F02C 7/22 29/428 |
| 2016/0298852 A1* | 10/2016 | Snyder, III ............... F23R 3/46 |
| 2020/0200390 A1 | 6/2020 | Lundgren et al. |

FOREIGN PATENT DOCUMENTS

| | | |
|---|---|---|
| JP | 2010-539438 | 12/2010 |
| JP | 2020-521907 | 7/2020 |

* cited by examiner

*Primary Examiner* — Scott J Walthour
(74) *Attorney, Agent, or Firm* — Wenderoth, Lind & Ponack, L.L.P.

(57) ABSTRACT

A combustor includes a combustion tube which has a tubular shape around an axis; a secondary fuel nozzle which is able to inject a secondary fuel in a radially inner direction with respect to the axis, inside the combustion tube; a fuel manifold which is disposed external to the combustion tube, and defines a fuel space which is able to temporarily store the secondary fuel; and a support which supports the fuel manifold with a gap extending radially from the combustion tube. The support has a support plate which is separated from the combustion tube by the gap and spreads in a circumferential direction with respect to the axis, and a support leg which is attached to the combustion tube and supports the support plate to define the gap between the support plate and the combustion tube.

10 Claims, 10 Drawing Sheets

COMBUSTOR AND GAS TURBINE EQUIPPED WITH THE SAME

CROSS-REFERENCE TO RELATED APPLICATION

Priority is claimed from Japanese Patent Application No. 2022-068230, filed Apr. 18, 2022, the content of which is incorporated herein by reference.

TECHNICAL FIELD

The present disclosure relates to a combustor and a gas turbine equipped with the same.

BACKGROUND ART

A gas turbine includes a compressor that compresses air, a combustor that combusts fuel with the air compressed by the compressor to generate combustion gas, and a turbine that is driven by the combustion gas from the combustor.

The combustor described in Patent Literature 1 below has a combustion tube for a transition piece) in which fuel is burned, a plurality of nozzles which inject the fuel into the combustion tube, and a fuel manifold. The combustor has a tubular shape around a combustor axis. Here, for the convenience of the following description, a direction in which the combustor axis extends will be referred to as an axial direction, and among both sides in the axial direction, one side will be referred to as a proximal end side and the other side will be referred to as a distal end side. The nozzle has a primary fuel nozzle and a secondary fuel nozzle. The primary fuel nozzle is disposed on the proximal end side of the combustion tube and injects the primary fuel toward the distal end side in the combustion tube. The secondary fuel nozzle is attached to the combustion tube at a position closer to the distal end side than the primary fuel nozzle, and injects the secondary fuel radially inward into the combustion tube. The fuel manifold is an annular space with respect to the combustor axis, and forms a fuel space in which the secondary fuel can be temporarily stored. An inward radial edge of the fuel space is defined by the combustion tube. Therefore, a part of the fuel manifold is formed by a part of the combustion tube.

CITATION LIST

Patent Literature

Patent Literature 1

Published Japanese Translation No. 2010-539438 of the PCT international Publication

SUMMARY

The temperature of the combustion tube is extremely high when the fuel is burning inside. On the other hand, the temperature of the fuel manifold depends on the temperature of the fuel supplied to a fuel space when the fuel is burning inside the combustion tube, and does not reach as high a temperature as the combustion tube. Specifically, when the fuel is burning inside the combustion tube, a temperature difference between the temperature of the combustion tube and the temperature of the fuel manifold becomes several hundred degrees or more. As a result, an extremely high stress is generated in a connecting portion between the combustion tube and the fuel manifold, and the durability of the combustion tube and fuel manifold is lowered.

Therefore, an object of the present disclosure is to provide a technology capable of enhancing the durability of the combustion tube and the fuel manifold.

A combustor as an aspect according to the present disclosure for achieving the above object includes a combustion tube which has a tubular shape around an axis and is able to burn fuel on an inner peripheral side; a primary fuel nozzle which is able to inject a primary fuel in a direction having a directional component toward a distal end side among the distal end side and a proximal end side in an axial direction in which the axis extends, inside the combustion tube; a secondary fuel nozzle which is attached to the combustion tube at a position closer to the distal end side than the primary fuel nozzle and able to inject a secondary fuel toward a radially inner side among the radially inner side and a radially outer side in a radial direction with respect to the axis, inside the combustion tube; a fuel manifold which is disposed on an outer peripheral side of the combustion tube, has an annular shape with respect to the axis, and forms a fuel space which is able to temporarily store the secondary fuel and communicates with the secondary fuel nozzle; and a support which supports the fuel manifold with a gap from the combustion cylinder in the radial direction. The support has a support plate which is separated from the combustion tube to the radially outer side and spreads in a circumferential direction with respect to the axis, and a support leg which is attached to the combustion tube and supports the support plate so that a space is formed between the support plate and the combustion tube. The fuel manifold is disposed on the radially outer side of the support plate and supported by the support.

The temperature of the combustion tube is extremely high when the fuel is burning inside. On the other hand, the temperature of the fuel manifold depends on the temperature of the fuel supplied to the fuel space when the fuel is burning inside the combustion tube and does not become as high as the combustion tube. Therefore, if the fuel manifold is directly connected to the outer peripheral surface of the combustion tube, an extremely high tress is generated in the connecting portion between the combustion tube and the fuel manifold.

In the present embodiment, since the support is interposed between the combustion tube and the fuel manifolds, a temperature gradient from the combustion tube to the fuel manifold is gentler than a temperature gradient when the fuel manifold is directly connected to the outer peripheral surface of the combustion tube. Moreover, the support of the present embodiment has a shape that is easily deformed. Therefore, in the present embodiment, the stress generated from the combustion tube to the fuel manifold can be suppressed to be low, and the durability of the combustion tube and the fuel manifold can be enhanced.

A gas turbine as an aspect according to the present disclosure for achieving the above object includes the combustor as above one aspect; a compressor which compresses air and is able to generate compressed air used for combustion of fuel inside the combustion tube; and a turbine which is able to be driven by a combustion gas generated by combustion of fuel in the combustor tube.

In an aspect of the present disclosure, it is possible to enhance the durability of the combustion tube and the fuel manifold.

DESCRIPTION OF EMBODIMENTS

Various embodiments of a combustor according to the present disclosure and a gas turbine equipped with the same will be described in detail below with reference to the drawings.

<Embodiment of Gas Turbine>

An embodiment of a gas turbine will be described with reference to FIG. 1.

Figure 1:
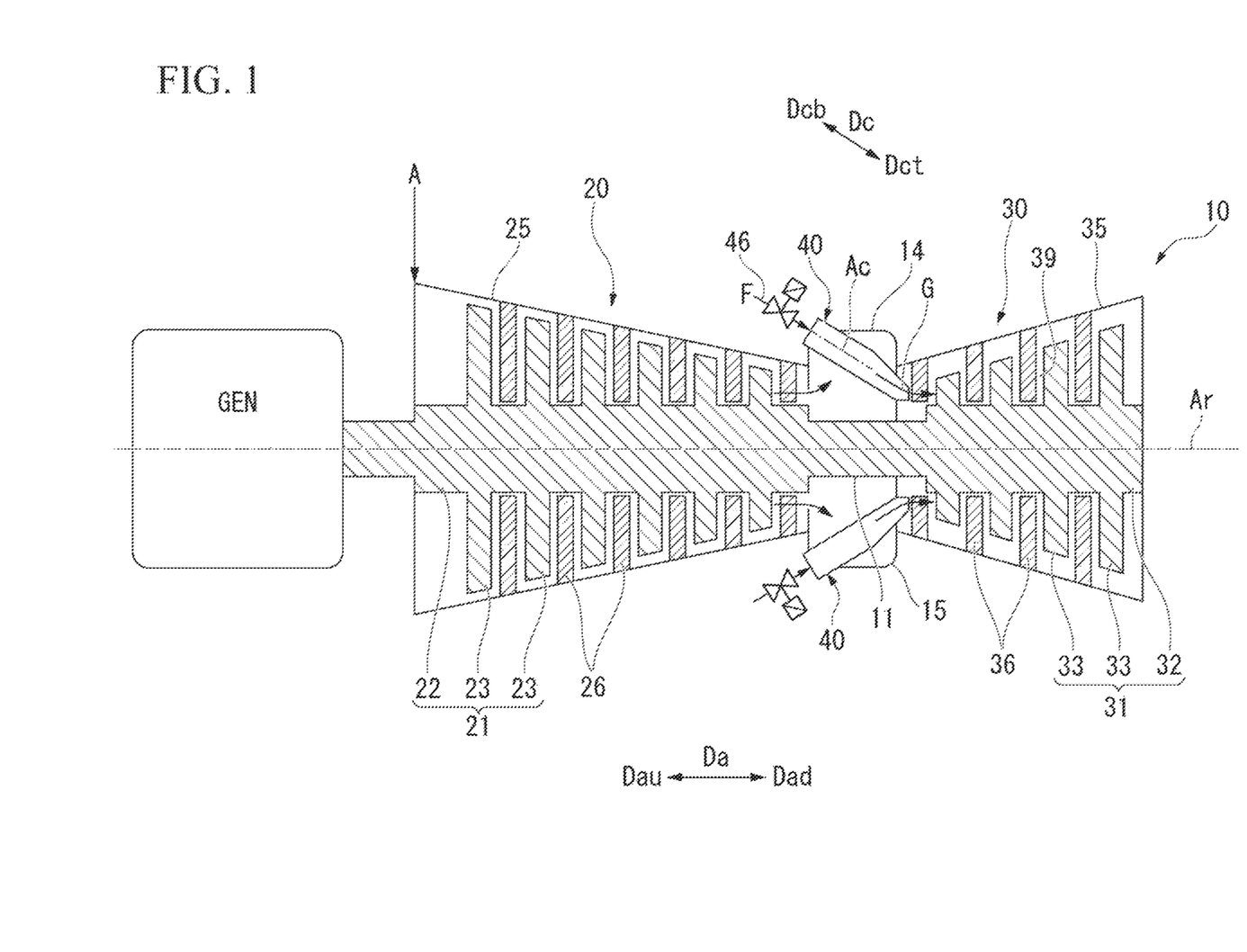
FIG. 1 is a schematic diagram showing a configuration of a gas turbine in an embodiment according to the present disclosure.

As shown in FIG. 1, a gas turbine 10 in the present embodiment includes a compressor 20 capable of compressing outside air A to generate compressed air, a plurality of combustors 40 capable of burning fuel F in compressed air to generate combustion gas G, and a turbine 30 that can be driven by the combustion gas G.

The compressor 20 has a compressor rotor 21 that rotates about a rotor axis Ar, a compressor casing 25 that covers the compressor rotor 21, and a plurality of stator blade rows 26. The turbine 30 has a turbine rotor 31 that rotates around the rotor axis Ar, a turbine casing 35 that covers the turbine rotor 31, and a plurality of stator blade rows 36. In the following description, a direction in which the rotor axis Ar extends is referred to as a rotor axial direction Da, one side of both sides in the rotor axial direction Da is referred to as an axial upstream side Dau, and the other side thereof is referred to as an axial downstream side Dad.

The compressor 20 is disposed on the axial upstream side Dau with respect to the turbine 30. The compressor rotor 21 and the turbine rotor 31 are positioned on the same rotor axis Ar and connected to each other to form the gas turbine rotor 11. For example, a rotor of a generator GEN is connected to the gas turbine rotor 11. The gas turbine 10 further includes an intermediate casing 14 disposed between the compressor casing 25 and the turbine casing 35. The compressed air from the compressor 20 flows into the intermediate casing 14. A plurality of combustors 40 are attached to the intermediate casing 14 side by side in a circumferential direction with respect to the rotor axis Ar. The compressor casing 25, the intermediate casing 14 and the turbine casing 35 are connected together to form the gas turbine casing 15.

The compressor rotor 21 has a rotor shaft 22 extending in the rotor axial direction Da around the rotor axis Ar, and a plurality of rotor blade rows 23 attached to the rotor shaft 22. The plurality of rotor blade rows 23 are aligned in the rotor axial direction Da. Each rotor blade row 23 is made up of a plurality of rotor blades aligned in a circumferential direction with respect to the rotor axis Ar. Any one stator blade row 26 of the plurality of stator blade rows 26 is disposed on the axial downstream side Dad of each of the plurality of rotor blade rows 23. Each stator blade row 26 is provided inside the compressor casing 25. Each stator blade row 26 is made up of a plurality of stator blades aligned in the circumferential direction with respect to the rotor axis Ar.

The turbine rotor 31 has a rotor shaft 32 extending in the rotor axial direction Da around the rotor axis Ar, and a plurality of rotor blade rows 33 attached to the rotor shaft 32. The plurality of rotor blade rows 33 are aligned in the rotor axial direction Da. Each rotor blade row 33 is made up of a plurality of rotor blades aligned in the circumferential direction with respect to the rotor axis Ar. Any one stator blade row 36 of the plurality of stator blade rows 36 is disposed at the axial upstream side Dau of each of the plurality of rotor blade rows 33. Each stator blade row 36 is provided inside the turbine casing 35. Each stator blade rows 36 is made up of a plurality of stator blades aligned in the circumferential direction with respect to the rotor axis Ar. In an annular space between the inner peripheral side of the turbine casing 35 and the outer peripheral side of the rotor shaft 32, a region in which the plurality of stator blade rows 36 and the plurality of rotor blade rows 33 are disposed forms a combustion gas flow path 39 through which the combustion gas G from the combustor 40 flows.

A fuel line 46 is connected to the combustor 40. The combustor 40 is able to burn the fuel F from the fuel line 46 in the compressed air from the compressor 20 to produce the combustion gas G.

<First Embodiment of Combustor>

A first embodiment of the combustor will be described with reference to FIGS. 2 to 4.

Figure 2:
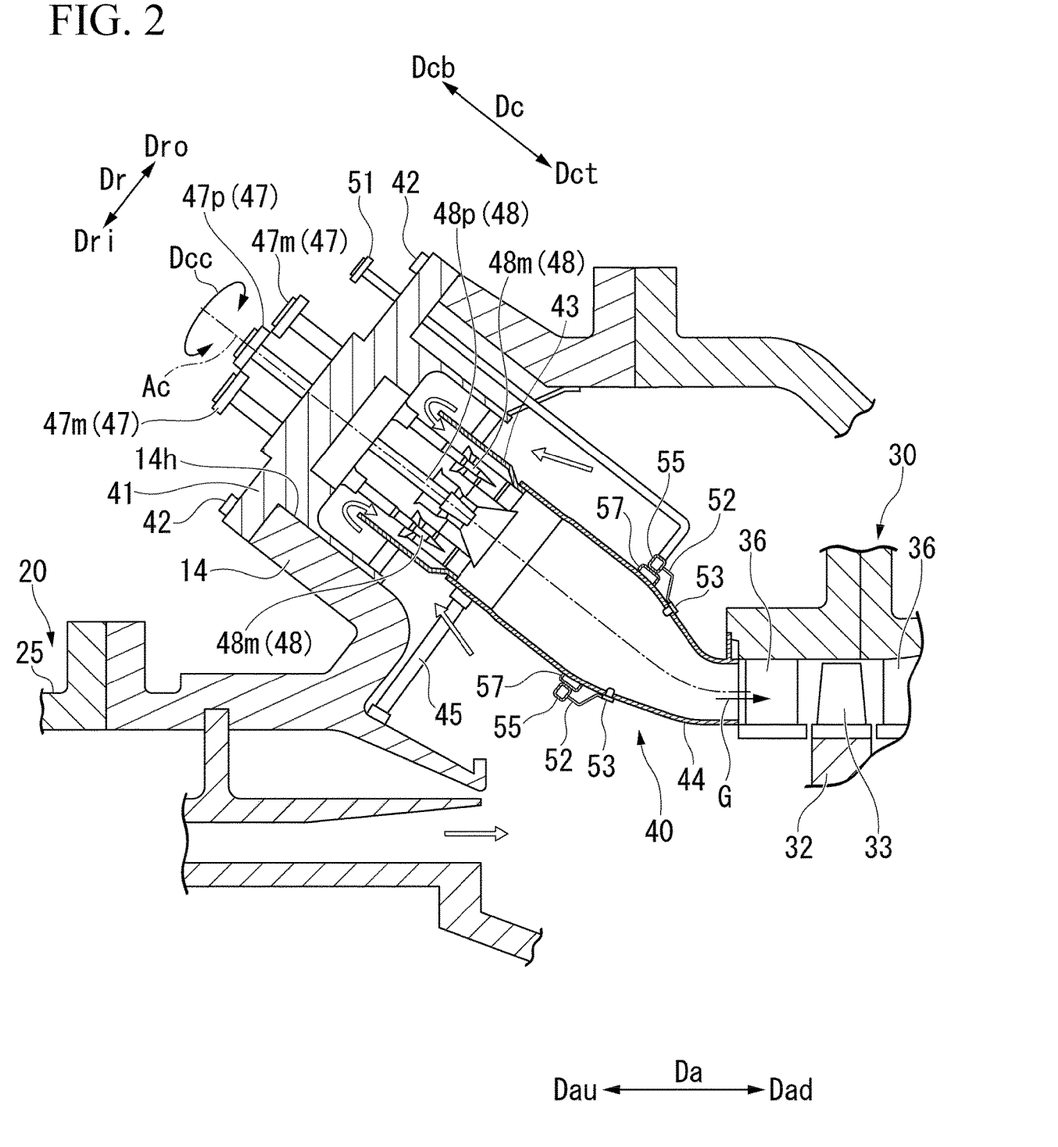
FIG. 2 is a cross-sectional view around a combustor of the gas turbine in a first embodiment according to the present disclosure.

As shown in FIG. 2, the combustor 40 in the present embodiment includes a flange 41, an inner tube 43, a combustion tube (or tail tube) 44, a plurality of primary fuel pipes 47, a plurality of primary fuel nozzles 48, a secondary fuel pipe 51, a branched secondary fuel pipe 52, a plurality of secondary fuel nozzles 53, a fuel manifold 55, and a plurality of supports 57.

The flange 41 extends in a radial direction from the combustor axis Ac. Both the inner tube 43 and the combustion tube 44 are disposed inside the intermediate casing 14. In addition, both the inner tube 43 and the combustion tube 44 have a tubular shape around the combustor axis Ac. Here, for the convenience of the following description, a direction in which the combustor axis (hereinafter referred to simply as an axis) Ac extends is referred to as an axial direction Dc. Among both sides in the axial direction Dc, one side is referred to as a distal end side Dct and the other side is referred to as a proximal end side Deb. Further, as shown in FIG. 1, the distal end side Dct is the axial downstream side Dad in the rotor axial direction Da, and the proximal end side Deb is the axial upstream side Dau in the rotor axial direction Da. Further, the axis Ac is inclined with respect to the rotor axis Ar to approach the rotor axis Ar toward the distal end side Dct. The circumferential direction with respect to the axis Ac is simply referred to as a circumferential direction Dcc. Also, the radial direction with respect to the axis Ac is simply referred to as a radial direction Dr. A side closer to the axis Ac in the radial direction Dr is referred to as a radially inner side Dri, and aside opposite to the radially inner side Dri is referred to as a radially outer side Dro.

A combustor attachment hole 14*h* which penetrates from the outside of the intermediate casing 14 into the intermediate casing 14 is formed in the intermediate casing 14. The flange 41 is attached to the intermediate casing 14 with bolts 42 to block the combustor attachment hole 14*h*. The inner tube 43 is attached to the flange 41. A plurality of primary fuel nozzles 48 are disposed on the inner peripheral side of the inner tube 43. The combustion tube 44 is connected to the portion of the distal end side Dct of the inner tube 43 via a sealing member or the like. The combustion tube 44 is supported by a tube support 45 or the like fixed to the inner surface of the intermediate casing 14.

All of the plurality of primary fuel nozzles 48 extend in the axial direction De and am formed with holes for injecting fuel. All of the plurality of primary fuel nozzles 48 are able to inject the primary fuel in a direction having a directional component toward the distal end side Dt. All of the plurality of primary fuel nozzles 48 are fixed to the flange 41. Among the plurality of primary fuel nozzles 48, one nozzle is a pilot nozzle 48*p*, and the other plurality of nozzles are main nozzles 48*m*. The pilot nozzle 48*p* is disposed on the axis Ac. The plurality of main nozzles 48*m* are aligned in the circumferential direction Dcc around the pilot nozzle 48*p*.

All of the plurality of primary fuel pipes 47 are pipes branched front the fuel line 46 and fixed to the flange 41. Among the plurality of primary fuel pipes 47, one fuel pipe is a pilot fuel pipe 47*p*, and the other plurality of fuel pipes are main fuel pipes 47*m*. The pilot fuel pipe 47*p* is connected to the pilot nozzle 48*p*. Each of the plurality of main fuel pipes 47*m* is connected to one main nozzle 48*m* of the plurality of main nozzles 48*m*.

The plurality of secondary fuel nozzles 53 are attached to the combustion tube 44 side by side in the circumferential direction Dcc at positions closer to the distal end side Dct than the plurality of primary fuel nozzles 48. All of the plurality of secondary fuel nozzles 53 are able to inject the secondary fuel toward the radially inner side Dri inside the combustion tube 44.

The fuel manifold 55 is disposed on the outer peripheral side of the combustion tube 44, on the side closer to the distal end side Dct than the primary fuel nozzle 48 and on the side closer to the proximal end side Dcb than the secondary fuel nozzle 53. The fuel manifold 55 is formed in an annular shape with respect to the axis Ac. The fuel manifold 55 forms an annular shape with respect to the axis Ac, and forms a fuel space 56 in which the secondary fuel can be temporarily stored. The aforementioned secondary fuel pipe 51 is connected to the fuel manifold 55. The secondary fuel pipe 51 is also a pipe branched from the fuel line 46 and fixed to the flange 41. The fuel manifold 55 and the plurality of secondary fuel nozzles 53 are connected by the plurality of branched secondary fuel pipes 52. Therefore, the fuel manifold 55 communicates with the plurality of secondary fuel nozzles 53 via the plurality of branched secondary fuel pipes 52 so that the secondary fuel in the fuel space 56 can be supplied to the plurality of secondary fuel nozzles 53.

Figure 3:
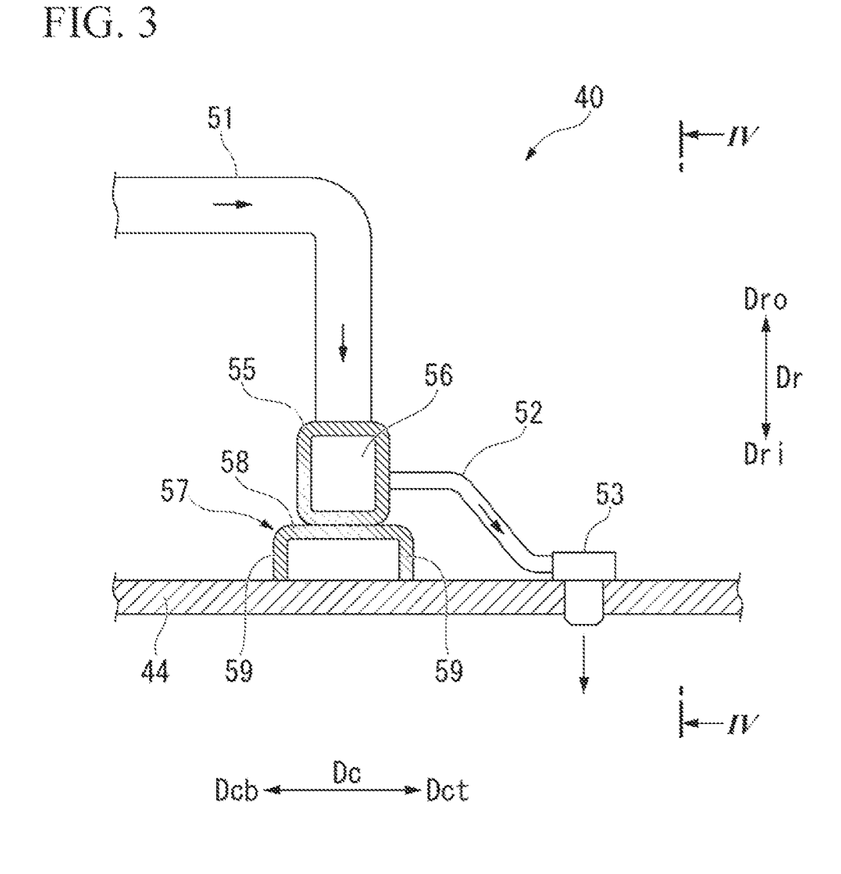
FIG. 3 is a cross-sectional view around a fuel manifold and a second fuel nozzle of the combustor in the first embodiment according to the present disclosure.
Figure 4:
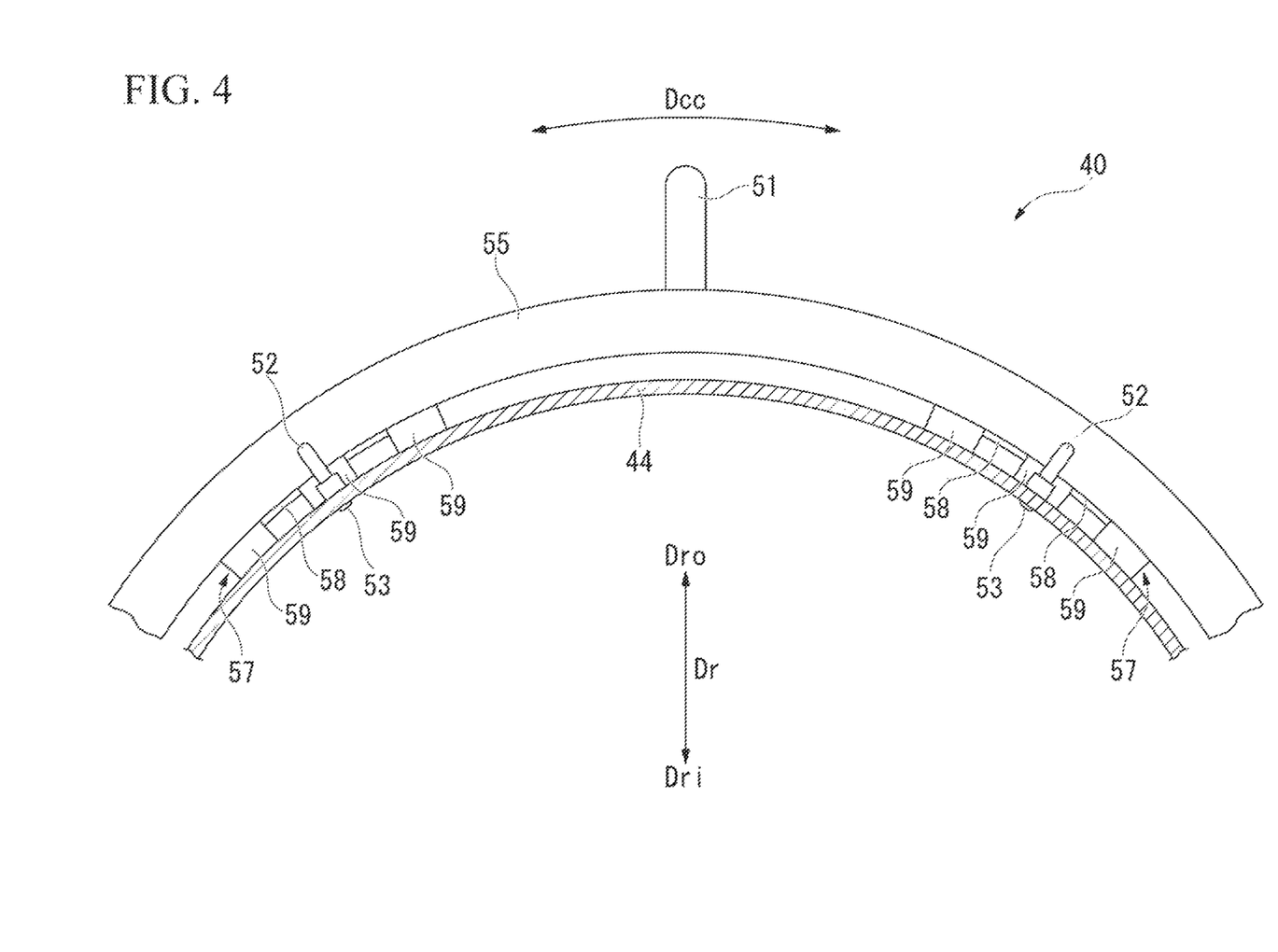
FIG. 4 is a cross-sectional view taken along a line IV-IV in FIG. 3.

As shown in FIGS. 3 and 4, the plurality of supports 57 support the fuel manifold 55 with a gap between them and the combustion tubes 44 in the radial direction Dr. The plurality of supports 57 are aligned in the circumferential direction Dcc. The support 57 has a support plate 58 that is spaced apart from the combustion tube 44 to the radially outer side Dro and spreads in the circumferential direction Dcc, and a plurality of support legs 59 that are attached to the combustion tube 44 and support the support plate 58 such that a space is formed between the support plate 58 and the combustion tube 44. Each of the plurality of support legs 59 is a plate-like member extending in the circumferential direction Dce. Among the plurality of support legs 59, some support legs 59 are connected to an edge of the proximal end side Deb of the support plate 58, and the remaining partial support legs 59 are connected to an edge of the distal end side Dct of the support plate 58. Some support legs 59 and remaining partial support legs 59 are opposite to each other with a gap in the axial direction Dc. Therefore, a space is formed between the support plate 58 and the combustion tube 44.

A pan of the annular fuel manifold 55 is connected to the support plate 58 of at least one support 57 among the plurality of supports 57 by welding or the like.

The temperature of the combustion tube 44 is extremely high when the fuel is burning inside. On the other hand, the temperature of the fuel manifold 55 depends on the temperature of the fuel supplied to the fuel space 56 when the fuel is burning inside the combustion tube 44 and does not become as high as the combustion tube 44. Therefore, if the fuel manifold 55 is directly connected to the outer peripheral surface of the combustion tube 44, an extremely high stress is generated in the connecting portion between the combustion tube 44 and the fuel manifold 55.

On the other hand, in the present embodiment, since the support 57 is interposed between the combustion tube 44 and the fuel manifold 55, a temperature gradient from the combustion tube 44 to the fuel manifold 55 is gentler than a temperature gradient when the fuel manifold 55 is directly connected to the outer peripheral surface of the combustion tube 44. Moreover, the support 57 of the present embodiment has a shape that is easily deformed. Therefore, in the present embodiment, the stress generated from the combustion tube 44 to the fuel manifold 55 can be suppressed to be low, and the durability of the combustion tube 44 and the fuel manifold 55 can be enhanced.

<Second Embodiment of Combustor>

Figure 5:
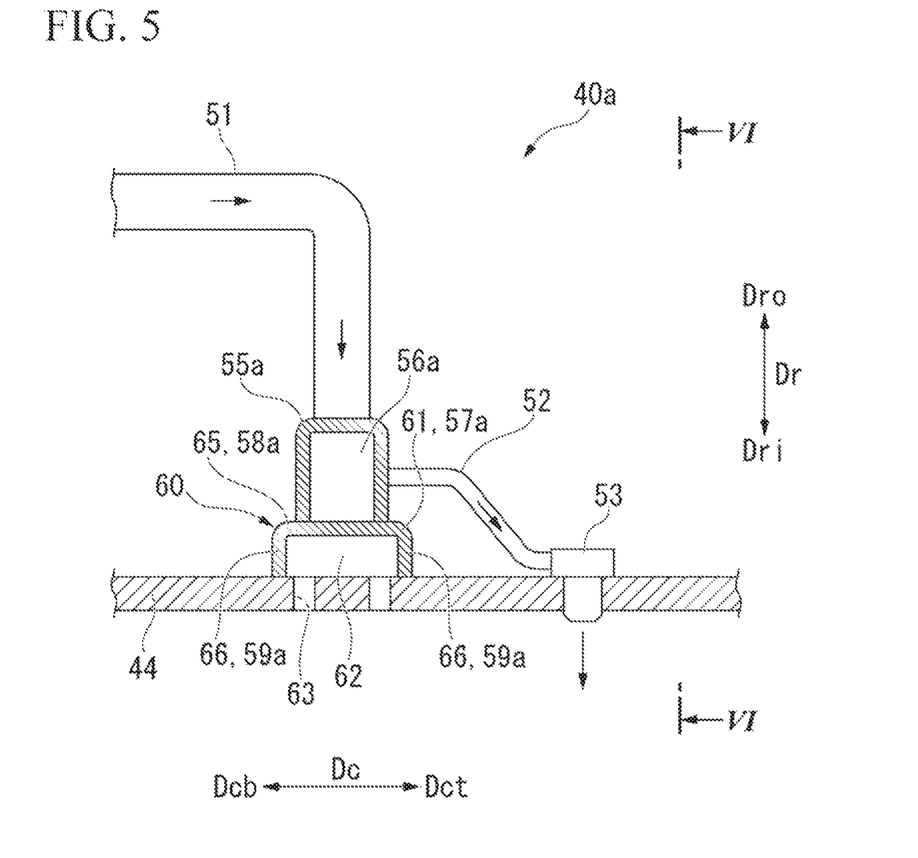
FIG. 5 is a cross-sectional view around the fuel manifold and the second fuel nozzle of a combustor in a second embodiment according to the present disclosure.
Figure 6:
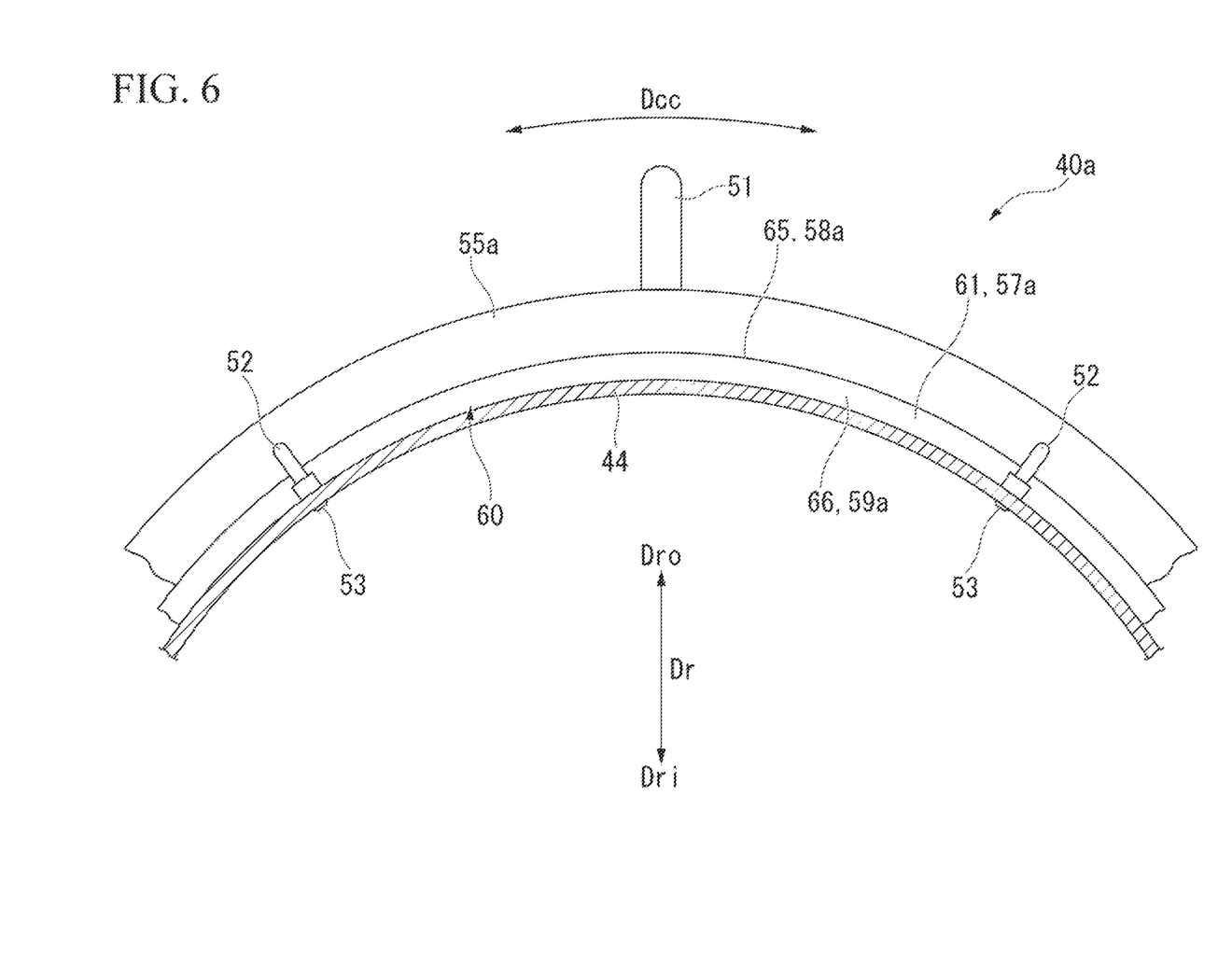
FIG. 6 is a sectional view taken along a line VI-VI in FIG. 5.

A second embodiment of the combustor will be described with reference to FIGS. 5 and 6.

The combustor in the present embodiment includes a flange 41, an inner tube 43, a combustion tube 44, a plurality of primary fuel pipes 47, a plurality of primary fuel nozzle 48, a secondary fuel pipe 51, a branched secondary fuel pipe 52, a plurality of secondary fuel nozzles 53, and a fuel manifold 55*a*, as in the combustor 40 in the first embodiment described using FIG. 2. Furthermore, as shown in FIGS. 5 and 6, the combustor 40*a* in the present embodiment includes an acoustic attenuator 60, as shown in FIGS. 5 and 6.

The acoustic attenuator 60 has an acoustic cover 61 that forms an acoustic space 62 on the outer peripheral side of the combustion tube 44 together with a part of the plate that forms the combustion tube 44. A plurality of through-holes 63 through which the inside of the combustion tube 44 and the acoustic space 62 communicates with each other are formed in a part of the plate forming the combustion tube 44 that defines a part of the acoustic space 62.

The acoustic cover 61 has a top plate 65 which is spaced from the combustion tube 44 to the radially outer side Dro, and a pair of side peripheral plates 66 which connects the top plate 65 and the combustion tube 44. The top plate 65 is opposite to the outer surface of the combustion tube 44, and has an annular shape around the axis Ac. The pair of side peripheral plates 66 form an annular shape around the axis Ac, and are opposite to each other with a gap in the axial direction Dc. Among the pair of side peripheral plates 66, one side peripheral plate 66 is connected to the edge of the proximal end side Deb of the top plate 65, and the other side peripheral plate 66 is connected to the edge of the distal end side Dct of the top plate 65.

As in the first embodiment, the fuel manifold 55a is able to supply the secondary fuel in the fuel space 56a to the plurality of secondary fuel nozzles 53, and communicates with the plurality of secondary fuel nozzles 53 via the plurality of branched secondary fuel pipes 52.

The fuel manifold 55a is disposed on the radially outer side Dro of the acoustic cover 61 described above and connected to the acoustic cover 61. Therefore, the acoustic cover 61 in the present embodiment functions as a support 57a for the fuel manifold 55a. Specifically, the top plate 65 of the acoustic cover 61 constitutes the support plate 58a of the support 57a, and the pair of side peripheral plates 66 of the acoustic cover 61 constitute the support legs 59a of the support 57a.

As described above, also in the present embodiment, since the acoustic cover 61 functions as the support 57a, as in the first embodiment, the stress generated from the combustion tube 44 to the fuel manifold 55a can be suppressed to a low level, and the durability of the combustion tube 44 and the fuel manifold 55a can be enhanced.

Furthermore, in the present embodiment, as described above, since the acoustic cover 61 functions as the support 57a, there is no need to provide a separate support, and the number of constituent components of the combustor 40a can be reduced.

Also, in the present embodiment, a part of the fuel manifold 55a is formed by including a part of the top plate 65 of the acoustic cover 61. Therefore, in the present embodiment, when the fuel manifold 55a is provided on the radially outer side Dro of the acoustic cover 61, the structures of the acoustic cover 61 and the fuel manifold 55a can be simplified.

<Third Embodiment of Combustor>

A third embodiment of the combustor will be described with reference to FIGS. 7 to 9.

Figure 7:
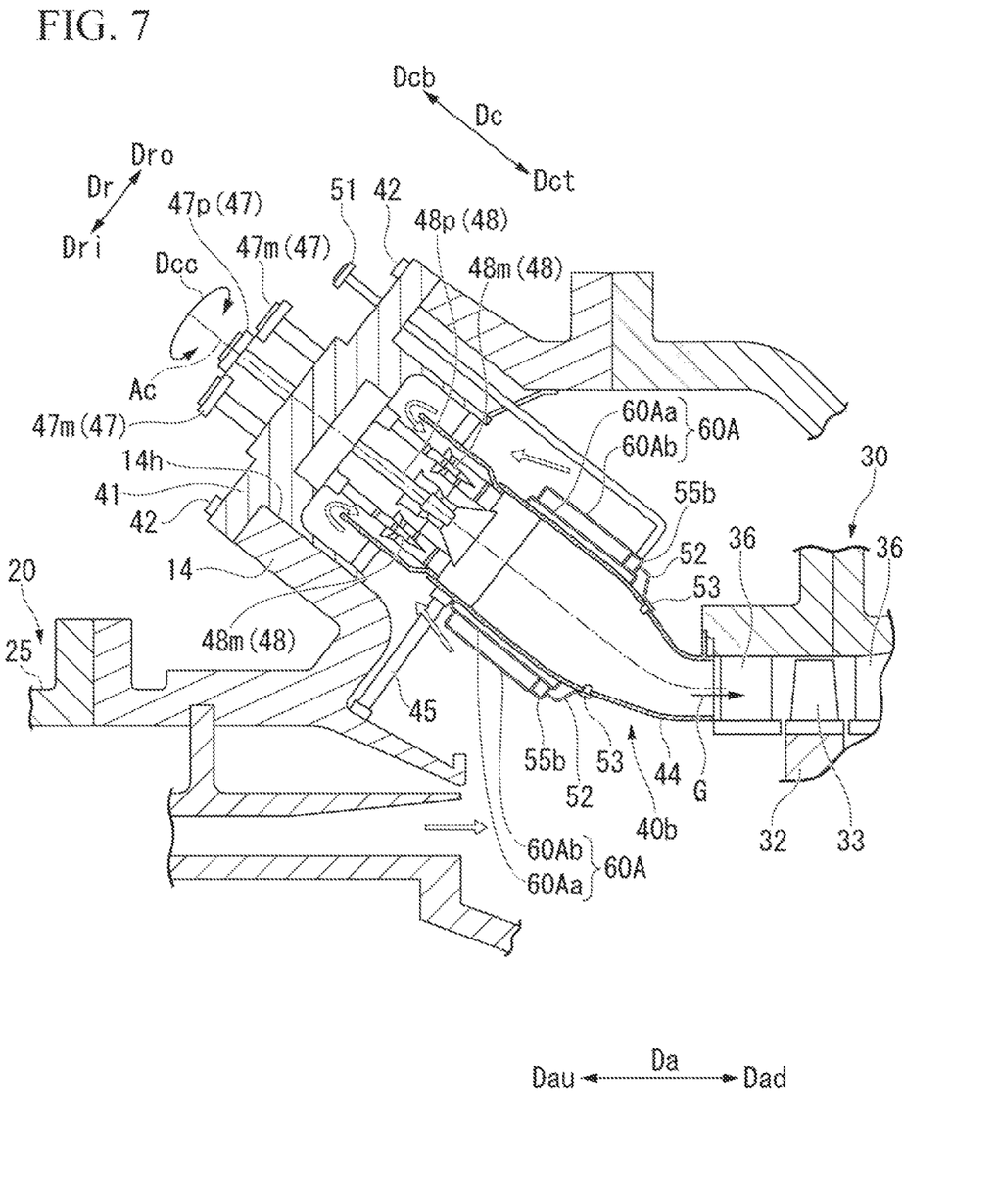
FIG. 7 is a cross-sectional view around a combustor of a gas turbine in a third embodiment according to the present disclosure.

As shown in FIG. 7, the combustor 40b in the present embodiment includes a flange 41, an inner tube 43, a combustion tube 44, a plurality of primary fuel pipes 47, a plurality of primary fuel nozzles 48, a secondary fuel pipe 51, a branched secondary fuel pipe 52, a plurality of secondary fuel nozzles 53, and a fuel manifold 55b, as in the combustors 40 and 40a in above each embodiment. Furthermore, the combustor 40b in the present embodiment includes an acoustic attenuator 60A, as in the combustor 40a in the second embodiment.

Figure 8:
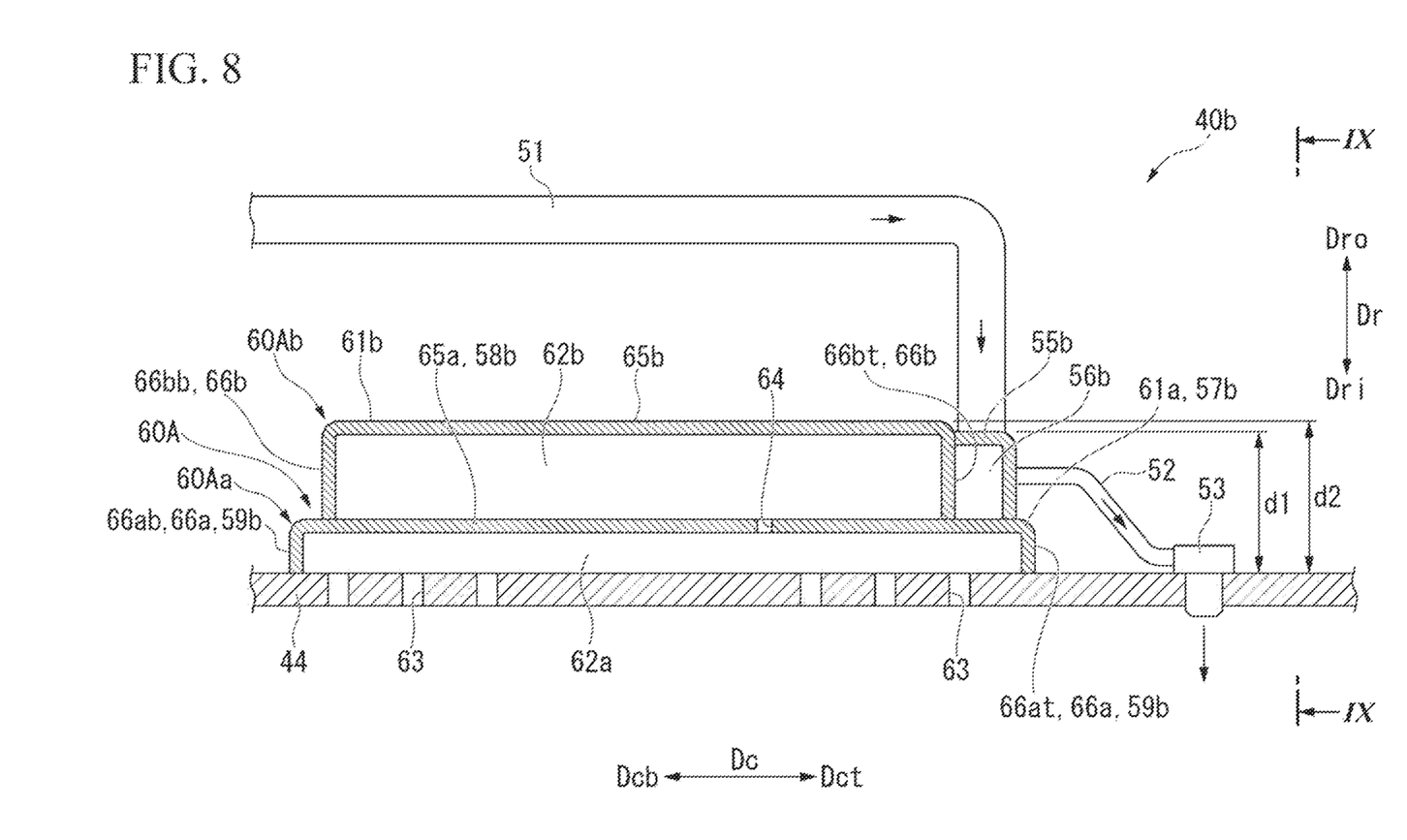
FIG. 8 is a cross-sectional view around a fuel manifold and a second fuel nozzle of the combustor in the third embodiment according to the present disclosure.
Figure 9:
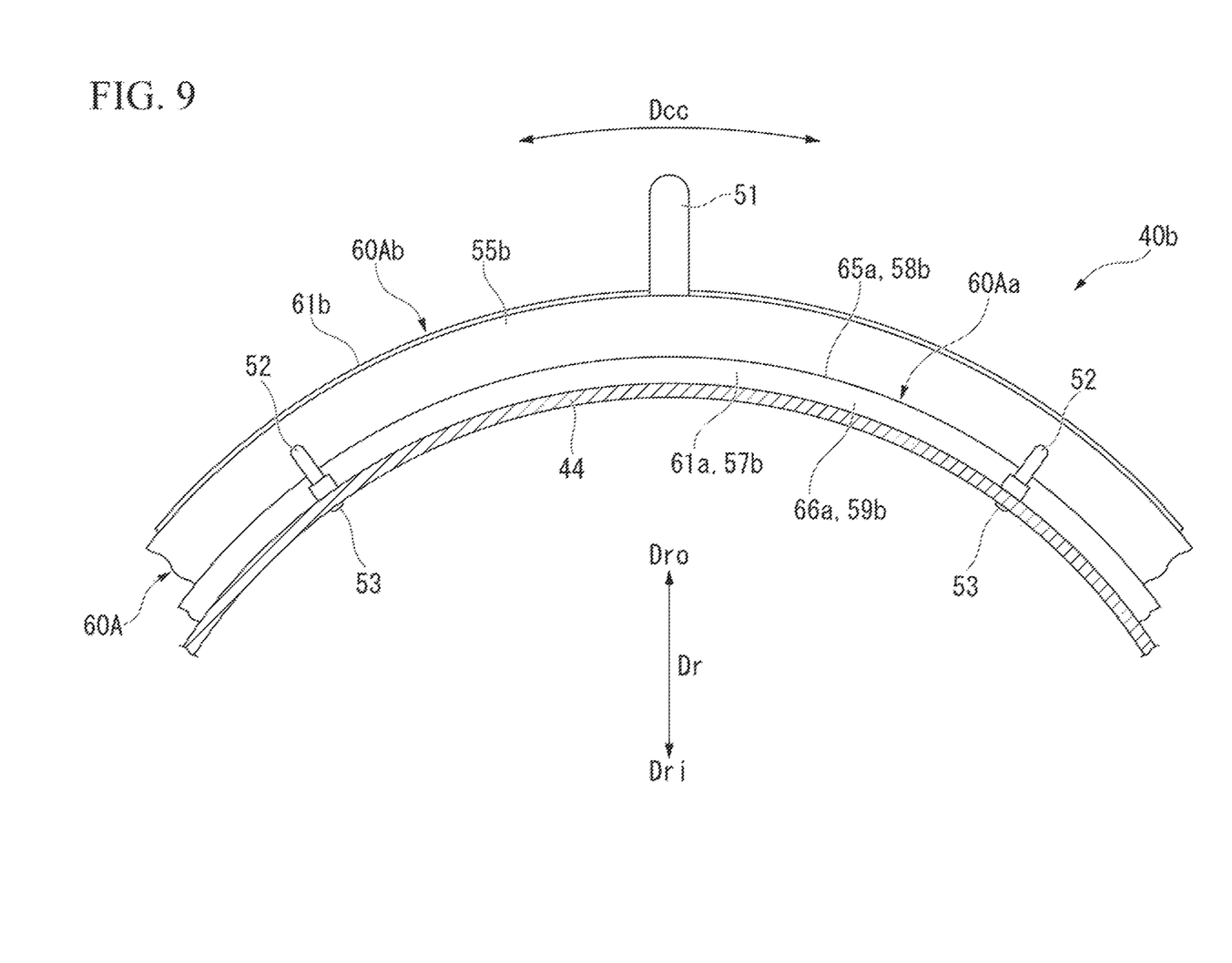
FIG. 9 is a cross-sectional view taken along a line IX-IX in FIG. 8.

As shown in FIGS. 8 and 9, the acoustic attenuator 60A in the present embodiment has a first acoustic attenuator 60Aa, and a second acoustic attenuator 60Ab disposed on the radially outer side Dro of the first acoustic attenuator 60Aa. The first acoustic attenuator 60Aa is a resonator that suppresses noise using the principle of Helmholtz resonance, and is sometimes called an acoustic liner. On the other hand, the second acoustic attenuator 60Ab is a resonator that suppresses noise in a specific frequency range using the principle of air column resonance, and is sometimes called an acoustic damper.

The first acoustic attenuator 60Aa has a first acoustic cover 61a that forms a first acoustic space 62a on the outer peripheral side of the combustion tube 44 together with a part of the plate that forms the combustion tube 44. A plurality of through-holes 63 through which the inside of the combustion tube 44 and the first acoustic space 62a communicate with each other are formed in a part of the plate that forms the combustion tube 44, which defines a part of the first acoustic space 62a. The first acoustic cover 61a has a first top plate 65a that is spaced apart from the combustion tube 44 to the radially outer side Dro, and a pair of first side peripheral plates 66a that connects the first, top plate 65a and the combustion tube 44. The first top plate 65a is opposite to the outer surface of the combustion tube 44, and has an annular shape around the axis Ac. This first top plate 65a defines the edge of the radially outer side Dro of the first acoustic space 62a. The pair of first side peripheral plates 66a form an annular shape around the axis Ac, and are opposite to each other with a gap in the axial direction Dc. Among the pair of first side peripheral plates 66a, the first proximal end side peripheral plate 66ab on the proximal end side Db is connected to the edge of the proximal end side Dcb of the first top plate 65a. Further, among the pair of first side peripheral plates 66a, the first distal end side peripheral plate 66at on the distal end side Dct is connected to the edge of the distal end side Dct of the first top plate 65a.

The second acoustic attenuator 60Ab has a second acoustic cover 61b that forms a second acoustic space 62b on the radially outer side Dro of the first acoustic cover 61a together with a part of the first top plate 65a. A plurality of through-holes 64 through which the first acoustic space 62a and the second acoustic space 62b communicate with each other is formed in a part of the first top plate 65a that defines the second acoustic space 62b. The second acoustic cover 61b has a second top plate 65b that is spaced apart from the first top plate 65a to the radially outer side Dro, and a pair of second side peripheral plates 66b that connect the second top plate 65b and the first top plate 65a. The second top plate 65b is opposite to the first top plate 65a, and has an annular shape around the axis Ac. The second top plate 65b defines the edge of the radially outer side Dro of the second acoustic space 62b. The pair of second side peripheral plates 66b form an annular shape around the axis Ac, and are opposite to each other with a gap in the axial direction Dc. Among the pair of second side peripheral plates 66), the second proximal end side peripheral plate 661b on the proximal end side Deb is connected to the edge of the proximal end side Dcb of the second top plate 65b. Among the pair of second side peripheral plates 66b, the second distal end side peripheral plate 66bt on the distal end side Dt is connected to the edge of the distal end side Dct of the second top plate 65b.

The fuel manifold 55b is disposed so that the fuel space 56b is located on the side closer to the radially outer side Dro than the first top plate 65a and on the side closer to the distal end side Dct than the second distal end side peripheral plate 66bt. A distance d1 from an outer peripheral surface of the combustion tube 44 to the edge of the radially outer side Dro of the fuel manifold 55b is equal to or less than a distance d2 from the outer peripheral surface of the combustion tube 44 to the edge of the radially outer side Dro of the second top plate 65b. A portion of the combustor 40b including the combustion tube 44 is inserted into the intermediate casing 14 from the combustor attachment hole 14h of the intermediate casing 14 when assembled to the intermediate casing 14. Therefore, the size of the cross section perpendicular to the axis Ac at this insertion portion is restricted by the size of the combustor attachment hole 14h. Therefore, the distance d1 from an outer peripheral surface of the combustion tube 44 to the edge of the radially outer side Dro of the fuel manifold 55b is restricted as described above to ensure an ease of assembly of the combustor 40b to the intermediate casing 14.

The fuel manifold 55b is disposed on the radially outer side Dro of the first acoustic cover 61a described above and connected to the first acoustic cover 61a. Therefore, the first acoustic cover 61a in the present embodiment functions as a support 57b for the fuel manifold 55h. Specifically, the first top plate 65a of the first acoustic cover 61a constitutes the support plate 58b of the support 57b, and a pair of first side peripheral plates 66a of the first acoustic cover 61a constitute the support legs 59b of the support 57b.

As described above, also in the present embodiment, since the first acoustic cover 61a functions as the support 57b, the stress generated front the combustion tube 44 to the fuel manifold 55b can be suppressed as in the above embodiments, and the durability of the combustion tube 44 and the fuel manifold 55b can be enhanced.

Furthermore, in the present embodiment, as in the second embodiment, since the first acoustic cover 61a functions as the support 57b, there is no need to provide a separate support, and the number of constituent components of the combustor 40b can be reduced.

Further, in the present embodiment, a part of the fuel manifold 55b is formed to have a part of the second distal end side peripheral plate 66bt of the second acoustic cover 61b and a part of the first top plate 65a of the first acoustic cover 61a. Therefore, in the present embodiment, when the fuel manifold 55b is provided on the radially outer side Dro of the first acoustic cover 61a and on the distal end side Dct of the second acoustic cover 61b, the structures of the first acoustic cover 61a, the second acoustic cover 61b and the fuel manifold 55b can be simplified.

<Various Modified Examples>

In the combustors 40, 40a, and 40b in the above embodiments, the fuel manifolds 55, 55a, and 55b are directly connected to the support plate 58 or the top plates 65 and 65a of the acoustic covers 61 and 61a functioning as the support plate. However, as in the combustor 40c shown in FIG. 10, a manifold receiver 67 may be provided on the radially outer side Dro of the first top plate 65a of the first acoustic cover 61a, and the fuel manifold 55c may be connected to the manifold receiver 67. That is, the support 57c of the fuel manifold 55c may be made up of the top plate 65a of the first acoustic cover 61a as the support plate 58b, the side peripheral plate 66a of the first acoustic cover 61a as the support leg 59b, and the manifold receiver 67.

Figure 10:
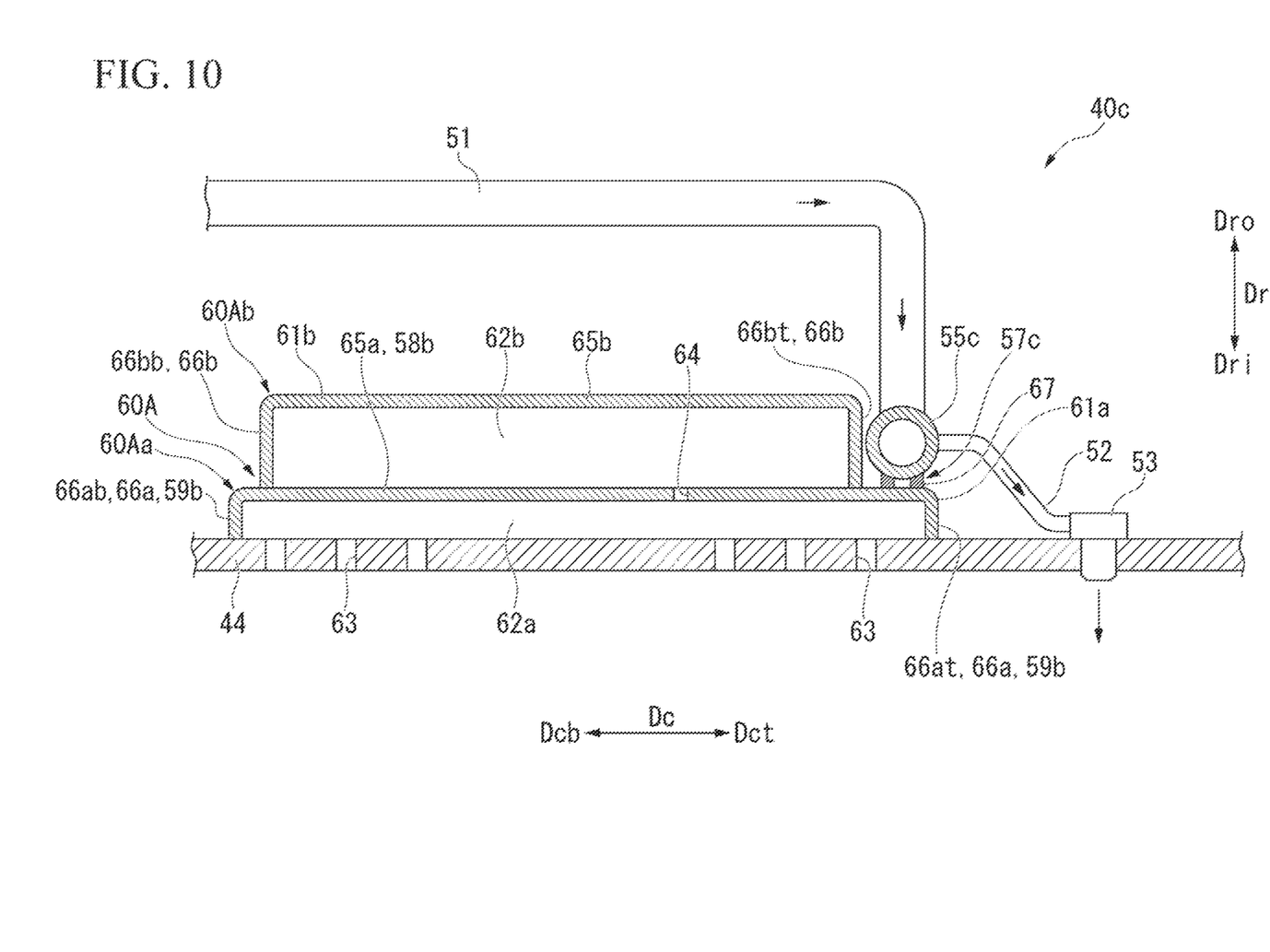
FIG. 10 is a cross-sectional view around a fuel manifold and a second fuel nozzle of a combustor in a modified example of a fourth embodiment according to the present disclosure.

By providing the manifold receiver 67 in this way, the temperature gradient from the combustion tube 44 to the fuel manifold 55c becomes gentler than the temperature gradient of a case where the manifold receiver 67 is not provided. Moreover, by providing the manifold receiver 67, the support 57c is more easily deformed than the case where the manifold receiver 67 is not provided. Therefore, by providing the manifold receiver 67, the stress generated from the combustion tube 44 to the fuel manifold 55c can be suppressed to a lower level than the case where the manifold receiver 67 is not provided, and the durability of the combustion tube 44 and the fuel manifold 55c can be enhanced.

Although the modified example shown in FIG. 10 is a modified example of the support 57b in the third embodiment, the manifold receiver 67 may also be added to the support 57 in the first embodiment and the support 57a in the second embodiment.

In each of the above embodiments and modified examples, the fuel manifolds 55, 55a, 55b, and 55c and the secondary fuel nozzle 53 are connected by the branched secondary fuel pipes 52. However, as long as the fuel manifolds 55, 55a, 55h, and 55c can be disposed so that the fuel manifolds 55, 55a, 55b, and 55c are in contact with the secondary fuel nozzle 53, the branched secondary fuel pipe 52 can be omitted.

In addition, the present disclosure is not limited to an embodiment and modified example described above. Various additions, changes, replacements, partial deletions, and the like are possible without departing from the conceptual idea and spirit of the present invention derived from the contents defined in the claims and equivalents thereof.

APPENDIX

The combustors 40, 40a, 40h, and 40c in the above embodiments are understood as follows, for example.

(1) The combustors 40, 40a, 40b, and 40c of a first aspect has a combustion tube 44 which has a tubular shape around an axis Ac and is able to burn fuel on an inner peripheral side, a primary fuel nozzle 48 which is able to inject a primary fuel in a direction having a directional component toward a distal end side Dct among the distal end side Dct and a proximal end side Deb in an axial direction Dc in which the axis Ac extends, inside the combustion tube 44; a secondary fuel nozzle 53 which is attached to the combustion tube 44 at a position closer to the distal end side Dct than the primary fuel nozzle 48 and able to inject a secondary fuel toward a radially inner side Dri among the radially inner side Dri and a radially outer side Dro in the radial direction Dr with respect to the axis Ac, inside the combustion tube 44; fuel manifolds 55, 55a, 55b, and 55c which are disposed on an outer peripheral side of the combustion tube 44, have an annular shape with respect to the axis Ac, and form fuel spaces 56, 56a and 56b which are able to temporarily store the secondary fuel and communicate with the secondary fuel nozzle 53; and supports 57, 57a, 57b, and 57c which support the fuel manifolds 55, 55a, 55b, and 55c with a gap from the combustion tube 44 in the radial direction Dr. The supports 57, 57a, 57b, and 57c have support plates 58, 58a, and 58b which are separated from the combustion tube 44 to the radially outer side Dro and spread in a circumferential direction Dcc with respect to the axis Ac, and support legs 59, 59a, and 59b which are attached to the combustion tube 44, and support the support plates 58, 58a, and 58b so that a space is formed between the support plates 58, 58a, and 58b and the combustion tube 44. The fuel manifolds 55, 55a, 55b, and 55c are disposed on the radially outer side Dro of the support plates 58, 58a, and 58b and supported by the supports 57, 57a, 57b, and 57c.

The temperature of the combustion tube 44 is extremely high when the fuel is burning inside. On the other hand, the temperatures of the fuel manifolds 55, 55a, 55b, and 55c depend on the temperature of the fuel supplied to the fuel spaces 56, 56a, and 56b when the fuel is burning inside the combustion tube 44 and do not become as high as the combustion tube 44. Therefore, if the fuel manifolds 55, 55a, 55b, and 55c are directly connected to the outer peripheral surface of the combustion tube 44, an extremely high stress is generated in the connecting portion between the combustion tube 44 and the fuel manifolds 55, 55a, 55b, and 55c.

In the present embodiment, since the supports 57, 57a, 57b, and 57c are interposed between the combustion tube 44 and the fuel manifolds 55, 55a, 55b, and 55c, a temperature gradient from the combustion tube 44 to the fuel manifolds 55, 55a, 55b, and 55c is gentler than a temperature gradient when the fuel manifolds 55, 55a, 55b, and 55c are directly connected to the outer peripheral surface of the combustion tube 44. Moreover, the supports 57, 57a, 57b, and 57c of the present embodiment have a shape that is easily deformed. Therefore, in the present embodiment, the stress generated from the combustion tube 44 to the fuel manifolds 55, 55a, 55b, and 55c can be suppressed to be low, and the durability of the combustion tube 44 and the fuel manifolds 55, 55a, 55b, and 55c can be enhanced.

(2) According to the combustors 40, 40a, 40b, and 40c of a second aspect, in the combustors 40, 40a, 40b, and 40c of the first aspect, the support legs 59, 59a, and 59b are connected to edges of the support plates 58, 58a, and 58b.

In the present embodiment, the support legs 59, 59a, and 59b are connected to the edges of the support plates 58, 58a, and 58b so that a space is formed between the support plates 58, 58a, and 58b and the combustion tube 44. Therefore, in this aspect, the supports 57, 57a, 57b, and 57c are easily deformed, and the stress generated from the combustion tube 44 to the fuel manifolds 55, 55a, 55b, and 55c can be suppressed to be low.

(3) According to the combustor 40 of a third aspect, in the combustor 40c of the first aspect or the second aspect, the support 57c has a manifold receiver 67 provided on the radially outer side Dro of the support plate 58b. The fuel manifold 55c is connected to the manifold receiver 67.

Since the support 57c has the manifold receiver 67, the temperature gradient from the combustion tube 44 to the fuel manifold 55c becomes gentler than the temperature gradient of a case where the manifold receiver 67 is not provided. Moreover, since the support 57c has the manifold receiver 67, the support 57c is more easily deformed than the case where the manifold receiver 67 is not provided. Therefore, since the support 57c has the manifold receiver 67, the stress generated front the combustion tube 44 to the fuel manifold 55c can be suppressed to a lower level than the case where the manifold receiver 67 is not provided, and the durability of the combustion tube 44 and the fuel manifold 55c can be enhanced.

(4) According to the combustors 40, 40a, 40b, and 40c of a fourth aspect.

in the combustor 40, 40a, 40b, and 40c of any one of the first to third aspects, the combustor includes a branched secondary fuel pipe 52 which connects the fuel manifolds 55, 5a, 55b, and 55c and the secondary fuel nozzles 53 to deliver the secondary fuel in the fuel spaces 56, 56a, and 56b to the secondary fuel nozzle 53, (5) According to the combustors 40a, 40b, and 40c of a fifth aspect.

in the combustors 40a, 40b, and 40c of any one of the first to fourth aspects, the combustor includes acoustic attenuators 60 and 60Aa which have acoustic covers 61 and 61a forming acoustic spaces 62 and 62a on the outer peripheral side of the combustion tube 44. The support plates 58a and 58b and the support legs 59a and 59b of the supports 57a, 57b, and 57c are made up of at least a part of the acoustic covers 61 and 61a.

In this aspect, since the support plates 58a and 58b and the support legs 59a and 59b of the supports 57a, 57b, and 57c are made up of at least a pan of the acoustic covers 61 and 61a, as in the first aspect, the stress generated from the combustion tube 44 to the fuel manifolds 55a, 55b, and 55c can be suppressed to be low, and the durability of the combustion tube 44 and the fuel manifolds 55a, 55b, and 55c can be enhanced.

Furthermore, in this aspect, since the acoustic covers 61 and 61a function as the supports 57a, 57b, and 57c, there is no need to provide a separate support, and the number of constituent components of the combustors 40a, 40b, and 40c can be reduced.

(6) According to combustors 40b and 40c of a sixth aspect, in the combustors 40b and 40c according to the fifth aspect, the acoustic attenuator 60A has a first acoustic attenuator 60Aa, and a second acoustic attenuator 60Ab disposed on the radially outer side Dro of the first acoustic attenuator 60Aa. The first acoustic attenuator 60Aa has a first acoustic cover 61a that forms a first acoustic space 62a on the outer peripheral side of the combustion tube 44 together with a part of the plate that forms the combustion tube 44. The first acoustic cover 61a has a first top plate 65a that extends in the circumferential direction Dcc apart from the combustion tube 44 toward the radially outer side Dro and defines an edge of the radially outer side Dro of the first acoustic space 62a, and a first side peripheral plate 66a that extends in the circumferential direction Dcc, connects an end of the first top plate 65a in the axial direction Dc and the combustion tube 44, and defines an edge of the first acoustic space 62a in the axial direction Dx. The support plate 58b of the supports 57b and 57c is made up of the first top plate 65a. The support legs 59b of the supports 57b and 57c are made up of the first side peripheral plate 66a.

Also in this aspect, as in the fifth aspect, since the support plate 58b and the support leg 59b of the supports 57b and 57c are made up of at least a part of the acoustic cover 61a, as in the first aspect, the stress generated from the combustion tube 44 to the fuel manifolds 55b and 55c can be suppressed to be low, and the durability of the combustion tube 44 and the fuel manifolds 55b and 55c can be enhanced.

(7) According to the combustor 40b in a seventh aspect, in the combustor 40b according to the sixth aspect, the second acoustic attenuator 60Ab has a second acoustic cover 61b that forms a second acoustic space 62b on the radially outer side Dro of the first acoustic cover 61a together with a part of the first top plate 65a. The second acoustic cover 61b has a second top plate 65b which extends in the circumferential direction Dcc apart from the first top plate 65a toward the radially outer side Dro to define an edge of the radially outer side Dro of the second acoustic space 62b, and a second side peripheral plate 66b which extends in the circumferential direction Dcc and connects an end of the second top plate 65b in the axial direction De and the first top plate 65a to define an edge of the second acoustic space 62b in the axial direction Dc. A distance d1 from an outer peripheral surface of the combustion tube 44 to the edge of the radially outer side Dro of the fuel manifold 55b is equal to or less than a distance d2 from the outer peripheral surface of the combustion tube 44 to the edge of the radially outer side Dro of the second top plate 65b.

In some cases, a portion of the combustor 40b including the combustion tube 44 is inserted into the casing 14 from the combustor attachment hole 14h of the casing 14 when assembled to the casing 14 of a case turbine. In this case, a size of a cross section perpendicular to the axis Ac at this insertion portion is restricted by a size of the combustor attachment hole 14h. Therefore, the distance d1 from an outer peripheral surface of the combustion tube 44 to the edge of the radially outer side Dro of the fuel manifold 55b is restricted as described above to ensure an ease of assembly of the combustor 40b to the casing 14.

(8) According to the combustor 40b of an eighth aspect.
in the combustor 40b in the seventh aspect, the first side peripheral plate 66a has a first distal end side peripheral plate 66at which is connected to the end of the distal end side Dct of the first top plate 65a, and defines an edge of the distal end side Dct of the first acoustic space 62a. The second side peripheral plate 66h has a second distal end side peripheral plate 66bt which is connected to the end of the distal end side Dct of the second top plate 65b, and defines an edge of the distal end side Dct of the second acoustic space 62b. The second distal end side peripheral plate 66bt is located to be closer to the proximal end side Dcb than the first distal end side peripheral plate 66at. The fuel manifold 55b is disposed so that the fuel space 56b is located to be closer to the radially outer side Dro than the first top plate 65a and closer to the distal end side DI than the second distal end side peripheral plate 66bt.

In this aspect, it is possible to effectively utilize the space closer to the radially outer side Dro than the first top plate 65a of the first acoustic cover 61a and closer to the distal end side Dct than the second distal end side peripheral plate 66bt of the second acoustic cover 61b.

(9) According to the combustor 40b of a ninth aspect,
in the combustor 40b of the eighth aspect, a part of the fuel manifold 55b is formed to have a part of the second distal end side peripheral plate 66bt and a part of the first top plate 65a.

In this aspect, when the fuel manifold 55b is provided on the radially outer side Dro of the first acoustic cover 61a and on the distal end side ti of the second acoustic cover 61b, structures of the first acoustic cover 61a, the second acoustic cover 61b, and the fuel manifold 55b can be simplified.

For example, a gas turbine 10 in the above embodiment is understood as follows.

(10) A gas turbine 10 of a tenth aspect includes
the combustors 40, 40a, 40b, and 40c according to any one of the first to ninth aspects, a compressor 20 that compresses air and is able to generate a compressed air used for combustion of fuel inside the combustion tube 44, and a turbine 30 that is able to be driven by a combustion gas generated by combustion of fuel in the combustion tube 44.

10 Gas turbine
11 Gas turbine rotor
14 Intermediate casing
14h Combustor attachment hole
15 Gas turbine casing
20 Compressor
21 Compressor rotor
22 Rotor shaft
23 Rotor blade ow
25 Compressor casing
26 Stator blade row
30 Turbine
31 Turbine rotor
32 Rotor haft
33 Rotor blade row
35 Turbine casing
36 Stator blade row
39 Combustion gas flow path
40, 40a, 40b, 40c Combustor
41 Flange
42 Bolt
43 Inner tube
44 Combustion tube (or tail tube)
45 Tube support
46 Fuel line
47 Primary fuel pipe
47p Pilot fuel pipe
47m Main fuel pipe
48 Primary fuel nozzle
48p Pilot nozzle
48m Main nozzle
51 Secondary fuel pipe
52 Branched secondary fuel pipe
53 Secondary fuel nozzle
55, 55a, 55b, 55c Fuel manifold
56, 56a, 56b Fuel space
57, 57a, 57b, 57c Support
58, 58a, 58b Support plate
59, 59a, 59b Support leg
60, 60A Acoustic attenuator
60Aa First acoustic attenuator
60Ab Second acoustic attenuator
61 Acoustic cover (support)
61a First acoustic cover (support)
61b Second acoustic cover
62 Acoustic space
62a First acoustic space
62b Second acoustic space
63, 64 Through-hole
65 Top plate (support plate)
65a First top plate (support plate)
65b Second top plate
66 Side peripheral plate (support leg)
66a First side peripheral plate (support leg)
66ab First proximal end side peripheral plate
66at First distal end side peripheral plate
66b Second side peripheral plate
66bb Second proximal end side peripheral plate
66bt Second distal end side peripheral plate
67 Manifold receiver
A Outside air
F Fuel
G Combustion gas
Ar Rotor axis
Ac Combustor axis (or simply axis)
Da Rotor axial direction
Dau Axial upstream side
Dad Axial downstream side
Dc Axial direction
Dcb Proximal end side
Dct Distal end side
Dcc Circumferential direction
Dr Radial direction
Dri Radially inner side
Dro Radially outer side

The invention claimed is:

1. A combustor comprising:
a combustion tube which has a tubular shape around an axis and is able to burn fuel;
a primary fuel nozzle which is able to inject a primary fuel in a direction toward a distal end of the combustion tube in an axial direction along the axis, inside the combustion tube;
a secondary fuel nozzle which is attached to the combustion tube at a position closer to the distal end of the combustion tube than the primary fuel nozzle and is able to inject a secondary fuel in a radially inner direction with respect to the axis, inside the combustion tube;
a fuel manifold which is disposed external to the combustion tube, has an annular shape with respect to the axis, and defines a fuel space which is able to temporarily store the secondary fuel and is in communication with the secondary fuel nozzle;
a support which supports the fuel manifold with a gap extending radially from the combustion tube;
a first acoustic attenuator; and
a second acoustic attenuator,
wherein:
the support has a support plate which is separated from the combustion tube by the gap and spreads in a circumferential direction with respect to the axis, and a support leg which is attached to the combustion tube and supports the support plate to define the gap between the support plate and the combustion tube;
the fuel manifold is disposed on a radially outer side of the support plate and is supported by the support;
the first acoustic attenuator has a first acoustic cover that defines a first acoustic space along an outer surface of the combustion tube;
the first acoustic cover has a first top plate that extends in the circumferential direction, is spaced radially apart from the combustion tube, and defines an edge of a radially outer side of the first acoustic space, and a first side peripheral plate that extends in the circumferential direction, connects an end of the first top plate in the axial direction and the combustion tube, and defines an edge of the first acoustic space in the axial direction;
the support plate is made up of the first top plate;
the support leg is made up of the first side peripheral plate; and
the second acoustic attenuator is disposed on a radially outer side of the first acoustic attenuator.

2. The combustor according to claim 1, wherein:
the second acoustic attenuator has a second acoustic cover that defines a second acoustic space on a radially outer side of the first acoustic cover together with a part of the first top plate;
the second acoustic cover has a second top plate which extends in the circumferential direction, is spaced radially apart from the first top plate, and defines an edge of a radially outer side of the second acoustic space, and a second side peripheral plate that extends in the circumferential direction, connects an end of the second top plate in the axial direction and the first top plate, and defines an edge of the second acoustic space in the axial direction; and
a radial distance from the outer surface of the combustion tube to an edge of a radially outer side of the fuel manifold is equal to or less than a radial distance from the outer surface of the combustion tube to the edge of the radially outer side of the second top plate.

3. The combustor according to claim 2, wherein:
a part of the first side peripheral plate Lia a first distal end side peripheral plate which is connected to a distal end side of the first top plate, and defines an edge of a distal end side of the first acoustic space;
a part of the second side peripheral plate is a second distal end side peripheral plate which is connected to a distal end side of the second top plate, and defines an edge of a distal end side of the second acoustic space;
the second distal end side peripheral plate is closer to a proximal end of the combustion tube than the first distal end side peripheral plate; and
the fuel manifold is disposed such that the fuel space is radially outward of the first top plate and closer to the distal end of the combustion tube than the second distal end side peripheral plate.

4. The combustor according to claim 3,
wherein a part of the fuel manifold is made up of a part of the second distal end side peripheral plate and a part of the first top plate.

5. A combustor comprising:
a combustion tube which has a tubular shape around an axis and is able to burn fuel;
a primary fuel nozzle which is able to inject a primary fuel in a direction toward a distal end of the combustion tube in an axial direction along the axis, inside the combustion tube;
a secondary fuel nozzle which is attached to the combustion tube at a position closer to the distal end of the combustion tube than the primary fuel nozzle and is able to inject a secondary fuel in a radially inner direction with respect to the axis, inside the combustion tube;
a fuel manifold which is disposed external to the combustion tube, has an annular shape with respect to the axis, and defines a fuel space which is able to temporarily store the secondary fuel and is in communication with the secondary fuel nozzle; and
a support which supports the fuel manifold with a gap extending radially from the combustion tube,
wherein:
the support has a support plate which is separated from the combustion tube by the gap and spreads in a circumferential direction with respect to the axis, and a support leg which is attached to the combustion tube and supports the support plate to define the gap between the support plate and the combustion tube;
the fuel manifold is disposed on a radially outer side of the support plate and is supported by the support;
the secondary fuel nozzle and the fuel manifold are disposed at different positions with respect to the axial direction; and the secondary fuel nozzle is axially aft of the support.

6. The combustor according to claim 5,
wherein the support leg is connected to an edge of the support plate.

7. The combustor according to claim 5, wherein:
the support has a manifold receiver disposed on the radially outer side of the support plate; and
the fuel manifold is connected to the manifold receiver.

8. The combustor according to claim 5, further comprising:
a branched secondary fuel pipe which connects the fuel manifold and the secondary fuel nozzle for delivering the secondary fuel in the fuel space to the secondary fuel nozzle.

9. The combustor according to claim 5, further comprising:
an acoustic attenuator which has an acoustic cover defining an acoustic space on an outer surface of the combustion tube,
wherein the support plate and the support leg are made up of at least a part of the acoustic cover.

10. A gas turbine comprising:
the combustor according to claim 5;

a compressor which is able to compress air so as to generate a compressed air used for combustion of fuel inside the combustion tube; and a turbine which is able to be driven by a combustion gas generated by combustion of fuel in the combustion tube.

\* \* \* \* \*